June 23, 1970    J. SAUBESTY    3,516,230
PAINT PLANTS WITH VENTILATION AND
PAINT-PARTICLE RECOVERY SYSTEM
Filed Feb. 13, 1967

United States Patent Office 3,516,230
Patented June 23, 1970

---

3,516,230
PAINT PLANTS WITH VENTILATION AND PAINT-PARTICLE RECOVERY SYSTEM
Jean Saubesty, Billancourt, France, assignor to Regie Nationale des Usines Renault, Billancourt, France
Filed Feb. 13, 1967, Ser. No. 615,397
Claims priority, application France, Feb. 18, 1966, 50,270
Int. Cl. B01d 47/00
U.S. Cl. 55—228                                                     1 Claim

ABSTRACT OF THE DISCLOSURE

Paint room equipped with a sedimentation or flotation tank connected on the one hand to an air suction system and on the other hand, through an air duct equipped with means for forming liquid washing sheets, to a single vertical passage elongated in the horizontal direction, formed along the bottom of the paint room between two inclined bottom walls thereof. A wash-liquid supply system is so disposed along and near the upper end of each inclined bottom wall that the liquid can stream along the greater part of their top surface, the air in the room being sucked by fan means through said vertical passage, said liquid sheets and said sedimentation tank.

---

This invention relates in general to paint plants and has specific reference to paint plants equipped with a ventilation and paint-particle recovery system in the paint rooms. As a rule, industrial paint rooms are equipped with a device for recovering the particles of paint which operates by air suction and circulation of a wash liquid, the air and liquid streams being brought in contact with each other so that the paint particles are entrained by the liquid streams in a sedimentation tank. Water is used in general as a wash liquid.

In plants of this character, in order to force the air and liquid streams in opposite directions the air is sucked upwards while the liquid is caused to flow downwards. In this case the air is subsequently conveyed through double vertical walls disposed on either side of the paint room and provided with baffles to improve the recovery of paint particles.

However, this arrangement, while permitting a surface or floor disposal of the paint room proper is attended in certain cases by the following disadvantages:

(1) The room dimensions are increased considerably;
(2) The provision of two lateral air exhausts is likely to create a state of unbalance in the air circuits;
(3) The necessary cleaning of the double-walled structure is difficult on account of their moderate thickness.

To avoid these drawbacks the present invention provides a paint plant in which the air is sucked from beneath the room and coaxially thereto by vacuumizing a sealed tank used for the sedimentation of the paint particles contained in the wash water.

According to this invention, the paint room comprises along its upper portion one or a plurality of air inlet orifices and is equipped with an elongated sealed sedimentation tank connected on the one hand to an air suction device and on the other hand to an air duct provided with a device for forming wash-liquid sheets which comprises a single elongated passage extending in the horizontal direction, formed in the bottom of the paint room between two inclined walls thereof and located substantially in a vertical plane containing the longitudinal center line of the room. A wash-liquid supply system is so disposed along and near the upper end of each one of said inclined walls that the liquid will stream down the greater part of their top surface.

In an arrangement of this type the wash liquid circulates in the same direction as the air to be scrubbed or freed of its solid particles, that is, downwardly, and the air is forced through several sheets of wash liquid before flowing into the sealed vacuumized sedimentation or flotation tank from which it is exhausted by the suction system.

Figure 1:
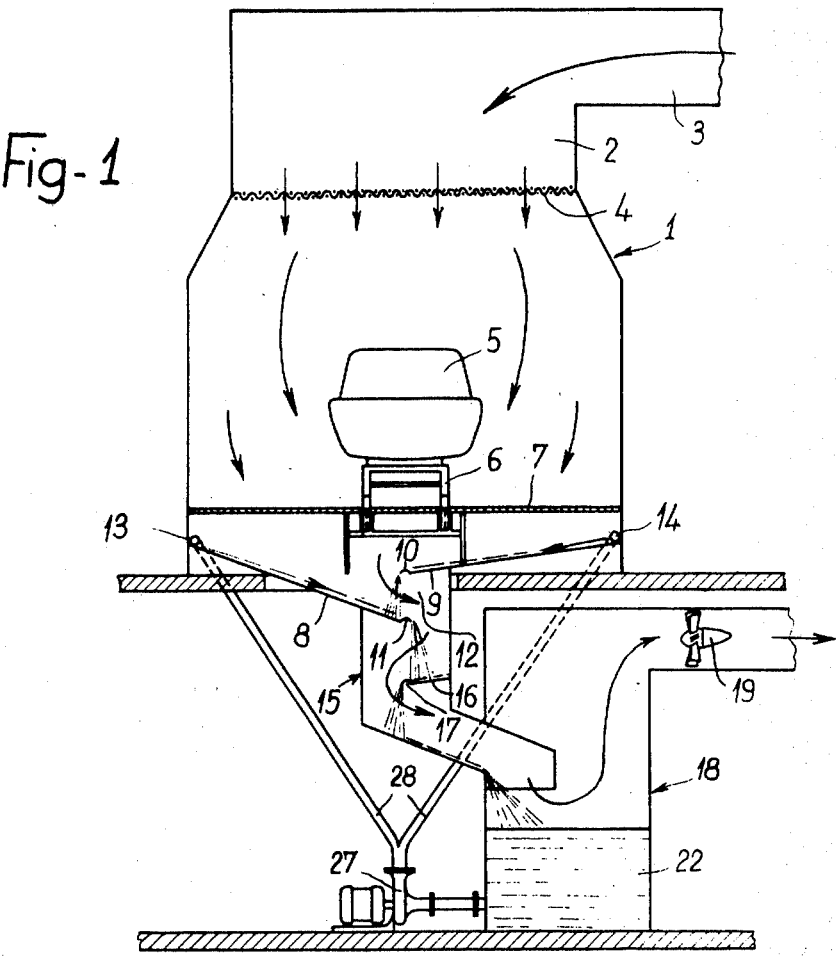
Figure 2:
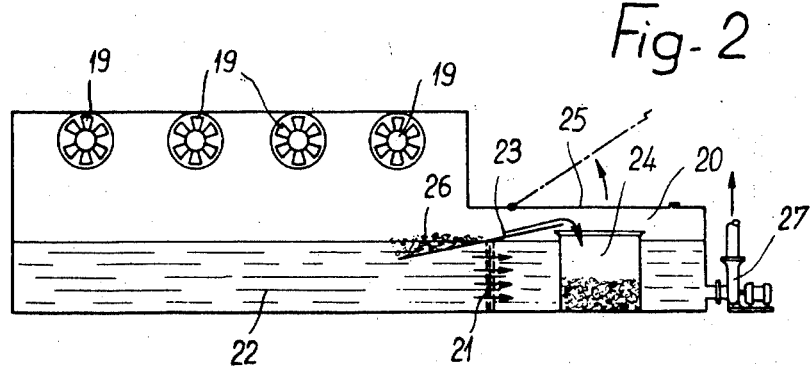

A typical example of a paint plant constructed according to the teachings of this invention will now be described by way of example with reference to the attached diagrammatical drawing in which:

FIG. 1 is a vertical section taken across the plant, and
FIG. 2 is another vertical section of the sedimentation tank, or flotation on a smaller scale.

As shown in FIG. 1, the upper portion of the paint room 1 constitutes a suction housing 2 connected to an air inlet duct 3. A distributor grid 4 is disposed between the housing 2 and the room proper to ensure a uniform distribution of the ventilation air throughout the horizontal cross-sectional area of the room. The articles to be painted, for instance the bodies 5 of automotive vehicles in the example illustrated, are caused to travel through the room 1 on suitable carriages 6. The paint spray or application means are not shown as they are not an integral part of this invention. The floor 7 for the operators of the paint plant is perforated to permit the passage of air therethrough. The bottom of the room 1 consists of a pair of plane surfaces 8 and 9 inclined downwards at different angles from their point of junction with the lateral walls of the room. Substantially at the vertical longitudinal median plane of the paint room, these two inclined planes have superposed and adequately shaped edges 10 and 11 leaving a vertical passage 12 therebetween.

A water supply device is provided in the form of water distributing or sprinkling rails 13 and 14 each distributor rails 13 and 14 are so disposed that the water 8 and 9 with the relevant side walls of the room 1. These distributor rails 13 and 14 are so disposed that the water issuing therefrom will stream over the greater part and preferably throughout the top surface of the inclined surfaces 8 and 9, the adequately shaped edges 10 and 11 thereof causing the water to form regular sheets flowing therefrom.

The passage 12 opens into a vertical air duct 15 provided with baffle means 16 also provided with suitably shaped edges 17, the arrangement being such that the water streaming from the upper edge 10 onto the lower inclined plane 8 flows over the edge 11 thereof onto the first baffle member 16, then over the edge 17 thereof and then onto the next baffle, if any, whereby the air sucked from the room into this duct is caused to flow through several sheets of water.

Of course, the baffle system may be replaced by water-atomizing or sprinkling rails mounted in the duct 15.

The air duct 15 opens into the sealed sedimentation tank 18 equipped at its upper portion with a plurality of fans 19 forcing the air to the outside so as to create a certain vacuum in the tank.

The tank 18 and duct 15 are advantageously of elongated configuration and substantially of same length as the paint room, the fans 19 being disposed at spaced intervals along one of the longitudinal walls of the tank.

As shown in FIG. 2, the tank comprises at one end a compartment 20 separated from the main body of the tank by a vertical filtering partition 21 having its upper edge substantially level with the liquid 22 in the tank. Secured above this partition is an inclined plane 23 having one end immersed in the liquid 22, as shown, and its other end overlying a paint receiving vat 24 disposed in said compartment 20.

An inspection door or lid 25 is mounted on the top wall of compartment 20, above the vat 24, so that an operator may use a suitable doctor blade for transferring the settled paint sludge 26 into the vat 24 and can remove the sludge from this vat without penetrating into the compartment.

Finally, a pump 27 draws the wash liquid from the compartment 20 and forces same again through the sprinkling rails 13 and 14 (FIG. 1) through a return line 28. This pump is also adapted to supply liquid to the water sprinkling rails disposed in the duct 15 in case these rails are used instead of the baffle means illustrated.

The paint plant illustrated by way of example in the drawing and described hereinabove operates as follows:

Due to the vacuum created in the tank 18, the air sucked into this tank is caused to follow the path shown by the arrows and flows through the duct 3 into the housing 2, then vertically across the paint room 1 proper and the space surrounding the body 5 to be painted, whereby the paint particles in suspension which are not deposited on the body 5 are entrained. The air stream loaded with paint particles will thus flow through the perforated floor 7, along the inclined planes 8 and 9 sprinkled with water, then through the water sheets formed in the longitudinal passage 12 and between the baffle means 16, so as to be freed of the paint particles, the scrubbed or cleansed air penetrating into the tank 18 and being subsequently extracted therefrom by the air fans 19.

The water loaded with paint particles is also caused to flow through this tank 18. A sedimentation thus takes place and the particles are thus caused to float as the water slowly penetrates into the compartment 20 through the filtering partition 21 where it is sucked by the pump 27 and forced back into the paint room through the return line 28.

It is only necessary to open the door 25 for periodically transferring by means of a suitable scraper or doctor the sedimentation or flotation sludge from the inclined plane 23 into the vat 24. When this vat is filled with paint, it can be either emptied or removed from the plant without having to penetrate into this plant.

Of course, the liquid level 22 in the tank remains constant because the water sucked and forced by the pump 27 returns very rapidly to the tank.

The paint plant according to this invention is characterised by many advantageous features. Thus:

(1) The surface erea of the paint room is reduced;
(2) The paint room construction is lighter in weight and cheaper;
(3) The air circulation is better balanced due to the single central suction system;
(4) The operators' work is facilitated due to the reduction of noise levels, as the fan mounting is remote from, and at a lower level than, the paint rooms, instead of being disposed laterally thereto, and
(5) All maintenance, cleaning and repair works are simplified due to the easier access through the door 25, independently of the paint room.

What is claimed is:

1. A paint plant comprising: an elongated paint room having two vertically extending walls forming opposing sides of said room, a downwardly inclined bottom member extending inwardly from each of said walls in the lower portion thereof to approximately the longitudinal center line of said room, said bottom members being inclined at different angles to the vertical thereby forming a central elongated horizontal passage therebetween, liquid supply means fed by a pump and extending along the upper portion of each of said bottom members for forming a film of liquid thereon, a duct connected with said passage for discharge of liquids and gas from said room, a tank below said paint room for fluids discharged through said duct, said tank having a liquid-collecting lower section and an upper section for gases and vapors, and means for reducing pressure within said tank and for removing gases and vapors therefrom, said tank comprising at one end a compartment from which the liquid is drawn by said pump, said compartment being separated from the remainder of said tank by a substantially vertical filtering partition of a height corresponding substantially to the liquid level in said tank, said partition having secured to its top edge an inclined plane for collecting floating paint having a first end immersed in the liquid contained in the tank and its second end overlying a paint receiving vat disposed in said compartment and an access door in a wall of said compartment.

References Cited

UNITED STATES PATENTS

| | | | |
|---|---|---|---|
| 3,138,087 | 6/1964 | Larsson et al. | 261—112 X |
| 3,123,455 | 3/1964 | Paasche | 55—228 |
| 2,788,954 | 4/1957 | Paasche | 55—228 X |
| 3,168,030 | 2/1965 | Wilhelmsson et al. | 98—115 |
| 3,341,016 | 9/1967 | Paasche | 55—228 X |

FRANK W. LUTTER, Primary Examiner

B. NOZICK, Assistant Examiner

U.S. Cl. X.R.

55—241, 467; 98—115; 261—112